United States Patent Office 3,025,171
Patented Mar. 13, 1962

3,025,171
DEHYDRATING VEGETABLES
Charles W. Schroeder, Teaneck, N.J., assignor to Thomas J. Lipton, Inc., Hoboken, N.J., a corporation of Delaware
No Drawing. Filed Dec. 11, 1956, Ser. No. 627,574
12 Claims. (Cl. 99—204)

This invention relates to a process for tenderizing and decreasing the cooking time of dehydrated vegetables and to the improved dehydrated vegetables obtained thereby.

The ordinary procedure in preparing a dehydrated vegetable for consumption requires that the dehydrated vegetable be placed in boiling water and cooked, generally in excess of 10 minutes. In addition, soaking at room temperature prior to cooking may be required. In the case of dehydrated soup mixes containing dehydrated vegetables, the directions generally require that the contents be added to boiling water and that the boiling be continued for 10 minutes after which the soup is ready for consumption. The relatively long cooking time required detracts from the convenience of using dehydrated vegetables. This is particularly a problem in the case of dehydrated soup mixes, where the feature of quick preparation is attractive to the consumer.

It has been found that dehydrated vegetables which have been subjected to ionizing radiation such as gamma rays or electron beams may be rehydrated to an edible and desirable texture within a relatively short period of time, for example, 3 minutes. Therefore, the substantially less time required for the preparation of vegetables which are irradiated in the dehydrated state is one of the marked advantages of the present invention.

It is recognized that efforts have been previously made to improve the storage or keeping properties of fresh vegetables by subjecting them to ionizing irradiation prior to cooking to destroy the various spoilage micro-organisms. The process has not been adopted, however, because the irradiation imparts undesirable properties to the vegetables and in many cases causes loss or deterioration of the flavor and/or loss of texture or other deleterious effects.

It has also been found that, according to this invention, the undesirable side effects caused by irradiation of vegetables by ionizing radiation such as gamma rays or electron beams may be substantially reduced or eliminated by irradiating the vegetable in its dehydrated state rather than its fresh, water-containing state.

It has also been found that dehydrated soup mixes may be prepared with the irradiated vegetables of this invention. These improved mixes may be prepared for consumption within as little as one minute boiling in water, thus making the soup more convenient to prepare.

The vegetables which may be treated according to this invention include dehydrated Lima beans, okra, corn, potatoes, green beans, celery, green and red bell peppers, peas, carrots, beets, onions, lentils, leek and cabbage. The vegetables derived from roots, leaves, stems and some fruit are benefited to the greatest extent when processed according to the process of this invention. High-starch vegetables, such as legumes and potatoes, respond to a lesser extent, but are nevertheless benefited in most instances.

The process of dehydration effects a substantial removal of water from the vegetable and in the usual commercial practices the moisture content of a given vegetable is reduced to the point where no significant change in quality occurs during the storage of the dehydrated vegetable at room temperature for a considerable length of time. Thus, the term "dehydration," as used in this art, does not mean a complete removal of water and dehydrated vegetables generally contain from 1–20% water in their dehydrated state.

Either the radioactivity resulting from the decay of radioactive materials such as the radioactive isotopes or the electron beam from an electron accelerator may be employed as a source of ionizing radiation. Where alpha, beta or neutron radiation occurs simultaneously with gamma radiation, the source may be shielded to absorb these less desirable types of radiation and to insure a uniform absorption of ionizing radiation throughout the mass of material being treated. Alpha or beta radiation may be undesirable from the standpoint of delivering excessive dosage to surface layers of the material treated. Neutron radiation would be undesirable because of its generation of radioactivity in the material.

In addition, it is noted that photon induced nuclear reactions such as gamma-neutron or gamma-proton reactions, with accompanying induced radio-activity, do not occur with the elements generally present in foods until the photon energy reaches about 10 mev. (million electron volts). Electron-induced nuclear reactions are likewise not found in this energy range. It is desirable, when treating the dehydrated food products according to this invention, that the photon or electron energy level be no more than 10 mev.

A higher irradiation level is generally obtained in a shorter period of time by using the electron beam of an electron accelerator such as the Van de Graaff type than with gamma sources. One such electron accelerator of medium size operates at 2,000,000 volts and a maximum of about 250 microamperes beam current. For convenience, this type of source is presently preferred, although it should be recognized that any suitable source of ionizing radiation may be employed in the practice of this invention. Alternate sources include mixed fission products from a nuclear reactor, provided undesirable radiation is screened out, or pile activated isotopes such as cobalt 60, as well as other types of electron accelerators.

In irradiating dehydrated vegetables, it is preferred that they be arranged so that they are substantially uniformly treated with the ionizing radiation. For example, where an electron accelerator is employed, the samples may be placed in suitable containers and arranged in a layer having a thickness which is no more than the maximum range of the electrons. With a Van de Graaff accelerator operating at 2,000,000 volts, for example, a layer of about 0.8 gram per square centimeter is preferred for economical utilization of the beam energy while maintaining fairly uniform treatment. Other methods for improving the uniformity of irradiation and the completeness of its utilization, such as by cross-firing and beam scanning, are well known to the art and also generally to be preferred where such facilities are available. The Van de Graaff electron accelerator mentioned above has a maximum range of about 1.0 g./sq. cm. when operating at this voltage. A greater penetration may be attained by operating electron accelerators at higher voltages, subject to the limitations of induced radioactivity. The penetration is essentially proportional to the voltage within the range of interest for this application.

The containers of vegetables are loaded onto a conveyor belt moving at 40 inches per minute and passed through the electron beam. The electron beam is preferably scanned back and forth across the conveyor belt at, for example, 200 cycles per second with a 7-inch sweep. These conditions will give a sufficiently uniform 2,000,000 "rep." dose when using the full 250 microampere beam current. A "rep." is a Roentgen-equivalent-physical, which is a unit of absorbed energy equal to 83.3 ergs per gram of irradiated product. (One million rep. equals 3.8 kilowatt-seconds per pound.) An increase in dosage may be obtained by again passing the material through the electron beam. Smaller dosages may be obtained by a reduction of the current employed in the Van de Graaff accelerator.

Known sources of gamma radiation may also be employed and utilized in any of the various procedures which are known to produce the desired dosage of radiation in the dehydrated vegetable. As aforementioned, the radioisotope cobalt 60 may be employed. This emits gamma rays of 1.17 and 1.33 mev. (million electron volts) energy, as well as a beta ray of 0.31 mev. The latter will normally be screened out by self-absorption or by the surrounding container. It is not essential that it be removed, as it is identical to an electron beam of the same energy and would have the same effect. Due to its short penetration range of about 0.15 g./sq. cm., however, it would tend to unevenly irradiate materials thicker than this. Accordingly its removal is generally desirable.

Other desiderata for utilization of gamma emitting isotopes are known to persons skilled in the art. These include the optimum shape and disposition of the source, the relative desirability of various kinds of sources and the extent and types of shielding required.

The type of radiation, whether electromagnetic or charged particles, has little influence up to energies of several mev. For practical purposes, gamma rays from radioisotopes or electron beams from accelerators are the most useful sources of radiation.

In preparing vegetables for treatment according to this invention, it is generally preferred that they may be of a uniform particle size and that their moisture content be reduced to a level where the vegetable may be stored at room temperature without undergoing deterioration. The maximum level will vary with each vegetable, and the values are generally well known in the art. Dehydrated vegetables frequently contain approximately 4% moisture.

The dosage of ionizing radiation required for a given decrease in rehydration time will vary with different vegetables. In general, the higher the dosage given, the greater will be the reduction in cooking time. A dosage range of about 1 to 11 million rep. has been found satisfactory in most instances. However, certain vegetables require a more restricted range. Dehydrated onion flakes, for example, are satisfactorily irradiated within a dosage range of 0.25–2.5 million rep.

The following examples illustrate several embodiments of this invention.

EXAMPLE 1

130 g. portions of dehydrated carrot flakes having a moisture content of 4.04% were prepared for exposure to electron beam radiation by placing them in paper-lined aluminum boxes 6″ x 12″ x 4″ deep. The carrots were distributed to provide a layer of uniform thickness. The boxes were placed on a conveyor belt travelling at 40 inches per minute and passed through the electron beam of a Van de Graaff electron accelerator of conventional design operating at 2,000,000 volts. The electron beam was scanned back and forth across the conveyor belt at 200 cycles per second. The scanned width was 7 inches.

Table I illustrates approximate radiation dosages provided by the Van de Graaff accelerator employed in this and the following examples when operated under the conditions given.

*Table I*

| Nominal dose (megarep.) | Beam current (microamperes) | Number of passes |
| --- | --- | --- |
| ¼ | 36 | 1 |
| ½ | 72 | 1 |
| 1 | 144 | 1 |
| 2 | 287 | 1 |
| 4 | 287 | 2 |
| 8 | 287 | 4 |

From these data and from FIGURE 3, "Distribution of Ionization in Materials Irradiated by Two and Three Million Volt Cathode Rays," J. App. Phys., 21, 345–8 (1950), the average doses given in this and the following examples were calculated. The effects of the tube window and the air path were not taken into account in the calculations, but were considered to be negligible.

The dehydrated carrots were exposed to three different irradiation dosage levels, viz. $1.4 \times 10^6$, $2.8 \times 10^6$ and $5.6 \times 10^6$ rep. Samples irradiated at each level were cooked for varying periods of time in boiling water and compared with a non-irradiated control. The control required cooking for ten minutes in boiling water to reach a satisfactory tenderness. Table II gives the results obtained.

*Table II*

| Dose (rep.×10⁶) | Cooking time (minutes) | Texture after cooking |
| --- | --- | --- |
| 5.6 | 2 | Considerably softer than control. |
|  | 1 | Do. |
| 2.8 | 4 | Softer than control. |
|  | 2 | Do. |
| 1.4 | 4 | Slightly softer than control. |
|  | 2 | Do. |
| None (control) | 10 | Satisfactory. |

No appreciable change in flavor was noted with the exception that the treated carrots were slightly sweeter than the control. This difference was probably due to the shorter cooking time and the corresponding lesser amount of leaching.

EXAMPLE 2

15 g. of dehydrated green beans which had been cut into a uniform size prior to dehydration were placed in a paper-lined aluminum box as described in Example 1. The dehydrated green beans had a moisture content of 2.41%. The beans were then passed through the electron beam of a Van de Graaff electron accelerator, as described in Example 1, to provide a radiation dosage of $4.8 \times 10^6$ rep. in the beans.

After periods of 2, 5 of 8 minutes of cooking in boiling water, the treated beans were more tender than a control of untreated beans cooked for 10 minutes. In addition, the treated samples had substantially the same flavor as that of the control.

EXAMPLE 3

130 g. portions of dehydrated celery flakes having a moisture content of 3.8% were irradiated according to the procedure outlined in Example 1. Four dosage levels, namely, $1.4 \times 10^6$, $2.8 \times 10^6$, $5.6 \times 10^6$ and $11.2 \times 10^6$ rep., were employed. The irradiated celery flake samples were cooked for varying periods of time in boiling water and compared with a control which had been cooked for 10 minutes. Table III below shows the results of these comparisons.

*Table III*

| Dose (rep.×10⁶) | Cooking time (minutes) | Texture after cooking |
| --- | --- | --- |
| 11.2 | 2 | Much more tender than control. |
|  | 1 | Do. |
| 5.6 | 2 | Noticeably more tender. |
|  | 1 | Do. |
| 2.8 | 2 | Slightly more tender. |
|  | 1 | Do. |
| 1.4 | 4 | Do. |
|  | 2 | Like control. |
| None (control) | 10 | Somewhat tough. |

The treated samples had substantially the same flavor as that of the control.

EXAMPLE 4

130 g. portions of mixed dehydrated green and red bell pepper flakes having a moisture content of 3.67% were irradiated according to the procedure outlined in Example 1. Four dosage levels, namely, $1.4 \times 10^6$, $2.8 \times 10^6$, $5.6 \times 10^6$ and $11.2 \times 10^6$ rep., were employed. The irradiated samples were cooked for varying periods of time in boiling water and compared with a control which had been cooked in boiling water for 10 minutes. Table IV shows the results of these comparisons.

Table IV

| Dose (rep.×10⁶) | Cooking time (minutes) | Texture after cooking |
|---|---|---|
| 11.2 | 2 | Softer than control. |
|  | 1 | Do. |
| 5.6 | 2 | Do. |
|  | 1 | Do. |
| 2.8 | 2 | Similar to control. |
|  | 1 | Do. |
| 1.4 | 4 | Slightly firmer. |
|  | 2 | Do. |
| None (control) | 10 | Satisfactory. |

The treated samples had substantially the same flavor as that of the control, with the exception that the samples irradiated at the 2.8 and 1.4 levels appeared to have a higher level of pepper flavor.

EXAMPLE 5

130 g. portions of dehydrated white onion flakes having a moisture content of 3.40% were irradiated according to the procedure outlined in Example 1. The onion flakes were subjected to the four dosage levels set forth in Table V below. The irradiated samples were cooked in boiling water for varying periods of time and compared with a control which had been cooked for 10 minutes in boiling water. Table V shows the results of these comparisons.

Table V

| Dose (rep.×10⁶) | Cooking time (minutes) | Texture after cooking |
|---|---|---|
| 2.2 | 1 | Softer. |
|  | 0.5 | Do. |
| 1.4 | 2 | Softer. |
|  | 1 | Slightly softer. |
| 0.7 | 2 | Do. |
|  | 1 | Do. |
| 0.35 | 4 | Do. |
|  | 2 | Close to control. |
| None (control) | 10 | Satisfactory. |

It is noted in the case of onions that a relatively low dosage level is required to provide a tenderizing effect as compared with the vegetables of the preceding examples. The irradiated samples both before and after cooking had substantially the same flavor as that of the control. With the extremely short cooking times, viz., 0.5 minutes for the 2.2 sample, and 1 minute for the 1.4 sample, a stronger onion odor was noticed.

EXAMPLE 6

15 g. samples of dehydrated cabbage having a moisture content of 4.2% were irradiated according to the procedure outlined in Example 1. The cabbage was subjected to two dosage levels, namely, $0.6 \times 10^6$ and $1.2 \times 10^6$ rep. For each dosage level, a cooking time of 5 minutes provided a cooked cabbage which was considerably improved in tenderness over the control which was cooked for 10 minutes. Cooking either of the irradiated samples for 3 minutes provided cabbage of about the same texture as the control cooked for 10 minutes, while cooking for 7 minutes provided a product which was too soft. The irradiated samples had substantially the same flavor as that of the control.

EXAMPLE 7

130 g. portions of dehydrated leek having a moisture content of 4.58% were irradiated according to the procedure set forth in Example 1. The dosage levels employed are shown in Table VI. The irradiated samples were cooked in boiling water for varying periods of time and compared with a control which had been cooked in a similar manner for 10 minutes. A comparison of the results obtained is shown in Table VI.

Table VI

| Dose (rep.×10⁶) | Cooking time (minutes) | Texture after cooking |
|---|---|---|
| 2.8 | 2 | More tender than control. |
|  | 1 | Slightly more tender than control. |
| 1.4 | 2 | Similar to control. |
|  | 1 | Slightly tougher than control. |
| 0.7 | 4 | Slightly more tender than control. |
|  | 2 | Similar to control. |
| None (control) | 10 | Somewhat tough. |

The irradiated samples had substantially the same flavor as that of the control.

EXAMPLE 8

130 g. portions of dehydrated toasted onion flakes having a moisture content of 1.13% were irradiated according to the procedure set forth in Example 1. The dosage levels employed are given in Table VII. The irradiated samples were cooked for varying periods of time and compared with a control which had been cooked for 10 minutes. Table VII shows the results of this comparison.

Table VII

| Dose (rep.×10⁶) | Cooking time (minutes) | Texture after cooking |
|---|---|---|
| 2.8 | 1 | Too soft (mushy). |
|  | 0.5 | Do. |
| 1.4 | 2 | Softer than control, but satisfactory. |
|  | 1 | Do. |
| 0.7 | 2 | Slightly softer than control. |
|  | 1 | Do. |
| 0.35 | 4 | Same as control. |
|  | 2 | Do. |
| None (control) | 10 | Satisfactory. |

It will be noted from the data presented that a dosage of $2.8 \times 10^6$ rep. is too high in the case of toasted onion flakes in that after cooking for as little as 0.5 minute the product is too soft and therefore unacceptable. No significant differences were found in the flavor of the irradiated samples when compared with the non-irradiated control.

EXAMPLE 9

15 g. portions of dehydrated green Lima beans having a moisture content of 3.83% were irradiated according to the procedure set forth in Example 1. The Lima beans had been previously dehydrated by following a process which included the steps of freezing the beans, thawing the beans and thereafter subjecting them to dehydration conditions. The dosages employed and the cooking results are indicated in Table VIII.

Table VIII

| Dose (rep.×10⁶) | Cooking time (minutes) | Texture after cooking |
|---|---|---|
| 8.1 | 2 | Noticeably softer than control, particularly the skins; absence of tough skins makes them more uniform. |
|  | 1 | Do. |
| 4.0 | 2 | Do. |
|  | 1 | Do. |
| 2.0 | 4 | Softer than control. |
|  | 2 | Tougher than control. |
| 1.0 | 4 | Same as control. |
|  | 2 | Tougher than control. |
| None (control) | 10 | Tough skins—soft interior |

In the case of green Lima beans, the tenderizing effect is particularly noticeable in the skins of the beans, thus providing Lima beans with a more uniform texture throughout. No undesirable flavor changes were evident in the irradiated samples.

EXAMPLE 10

15 g. portions of okra which had been previously sulfited, frozen, thawed and dehydrated to a moisture content of 3.68% were irradiated according to the procedure set forth in Example 1. The irradiation dosage levels employed, together with the cooking results obtained, are given in Table IX.

*Table IX*

| Dose (rep.×10⁶) | Cooking time (minutes) | Texture after cooking |
|---|---|---|
| 8.1 | 2 | Softer than control. |
|  | 1 | Do. |
| 4.0 | 2 | Not quite as tender. |
|  | 1 | Do. |
| 2.0 | 4 | Same as control. |
|  | 2 | Slightly less tender. |
| 1.0 | 4 | Do. |
|  | 2 | Tougher. |
| None (control) | 10 | Satisfactory. |

All the irradiated okra samples lost their normal mucilaginous slippery feel in the mouth. This characteristic is apparently preferred by some consumers and not preferred by others. Its loss is not considered undesirable. The flavor of the irradiated samples was substantially unchanged.

EXAMPLE 11

60 g. portions of dehydrated potato cubes, some being ⅜ of an inch and some being ¼ of an inch square, and having a moisture content of 7.56%, were irradiated according to the procedure set forth in Example 1. The irradiation doses and comparative cooking times are given in Table X.

*Table X*

| Dose (rep.×10⁶) | Cooking time (minutes) | Texture after cooking |
|---|---|---|
| 9.3 | 8 | Softer, but not as plumped up. |
| 4.6 | 8 | Slightly softer, not hydrated. |
| 2.3 | 12 | Similar, but not rehydrated. |
| 1.2 | 12 | Tougher. |
| None (control) | 20 | Not fully cooked. |

As can be seen from the data presented above, the potato cubes are not benefited to as great an extent as the vegetables described in the preceding examples. However, no undesirable flavor change is shown in the irradiated potatoes, and at the higher dosage levels, the texture of the irradiated sample after 8 minutes of cooking is noticeably softer than that of the non-irradiated sample after 20 minutes of cooking.

EXAMPLE 12

60 g. portions of beet cubes (⅜ of an inch square) having a moisture content of 6.88% were irradiated according to the procedure set forth in Example 1. The irradiation doses and comparative cooking times are given in Table XI.

*Table XI*

| Dose (rep.×10⁶) | Cooking time (minutes) | Texture after cooking |
|---|---|---|
| 4.6 | 4 | Same as C20, but less hyd. |
|  | 2 | Same as C10, but less hyd. |
|  | 1 | Tougher than C10. |
| 2.3 | 8 | Same as C20, but less hyd. |
|  | 2 | Tougher than C10. |
|  | 1 | Still tougher. |
| 1.2 | 10 | Like C20. |
|  | 4 | Like C10. |
|  | 2 | Tougher. |
| None (C10) (control) (C20) | 10 | Tough. |
|  | 20 | Almost cooked. |

In this instance, two controls, one cooked for 10 and the other for 20 minutes, were employed. The 10 minute control is designated C10, while the 20 minute control is designated C20. As in the case of carrots, the irradiated beets were found to have a somewhat sweeter flavor, but the flavor was otherwise substantially unchanged.

EXAMPLE 13

60 g. portions of lentils having a moisture content of 9.79% were irradiated according to the procedure set forth in Example 1. The dosage levels employed and the cooking results are shown in Table XII.

*Table XII*

| Dose (rep.×10⁶) | Cooking time (minutes) | Texture after cooking |
|---|---|---|
| 9.3 | 15 | Not quite as soft in centers, but skins are soft; not mushy. |
| 4.6 | 20 | Do. |
| 2.3 | 30 | Softer than above—not mushy. |
| 1.2 | 30 | Do. |
| None (control) | 30 | Soft, mushy centers—tough skins. |

It will be noticed that the tenderizing effect is not as great in this case as with some of the leaf or root vegetables described in preceding examples. However, the lentil skin has been tenderized to a considerable extent by the irradiation and this is a desirable change. The flavor of the irradiated lentils was substantially unchanged over that of control.

EXAMPLE 14

A sample of dehydrated carrots like that described in Example 1 was exposed to the gamma radiation from cobalt 60. The accompanying beta particles were absorbed by shielding of sufficient thickness. Exposure was continued until a dose of 1,500,000 roentgens had been delivered. It was found that this sample became as tender after five minutes in boiling water as the unirradiated control after ten minutes of boiling. Irradiation did not noticeably affect the flavor or color of the treated sample.

EXAMPLE 15

Dehydrated celery flakes similar to those of Example 3 were irradiated with the gamma rays of cobalt 60 to a dose level of 2,400,000 roentgens. This sample was found to be at least as tender after a 4-minute boil as the untreated control after a 10-minute boil. No color or flavor differences between the two were detected.

EXAMPLE 16

Results very similar to those of Example 15 were obtained on dehydrated green and red bell pepper flakes irradiated in the same way. A 4-minute boil sufficed to make the treated peppers at least as tender as the control sample after 10 minutes' boiling. Again no flavor or color differences were detected.

EXAMPLE 17

Dehydrated white onion flakes were markedly tenderized by a 2,400,000 roentgen dose of gamma rays from cobalt 60. Whereas untreated flakes require boiling for 10 minutes to become palatable, the irradiated sample was equally tender immediately after boiling water was poured over it. When boiled for periods of 4, 7 or 10 minutes it became undesirably mushy. The irradiation caused a slight darkening, but not enough to be of practical consequence.

EXAMPLE 18

A suitable dehydrated soup mix which may be cooked in from 1 to 2 minutes was formulated with the irradiated vegetables of this invention. The formula was as follows.

TOMATO VEGETABLE SOUP

| Ingredient: | G. |
|---|---|
| Sugar | 8.0 |
| Salt | 7.0 |
| Flour | 7.1 |
| Tomato powder | 6.6 |
| Starch | 5.2 |
| Protein hydrolysate | 5.3 |
| Dehydrated carrot flakes (irradiated $1.4 \times 10^6$ rep.) | 4.9 |
| Hydrogenated vegetable oil | 4.5 |
| Dehydrated white onion flakes (irradiated $0.7 \times 10^6$ rep.) | 2.5 |
| Spices | 2.0 |
| Dehydrated bell pepper flakes (irradiated $2.8 \times 10^6$ rep.) | 1.7 |
| Dehydrated celery flakes (irradiated $11.2 \times 10^6$ rep.) | 1.2 |
| Total | 56.0 |

The soup mix was prepared by adding one quart of boiling water to the above mixture and cooking for 1 minute. When compared to a similar mix containing non-irradiated vegetables which was boiled for 10 minutes, no difference could be found. The flavor level of the broth from both the irradiated and control soup mixes was substantially the same. Any differences in the extent of rehydration of the irradiated dehydrated vegetables were not noticeable.

EXAMPLE 19

An onion soup mix which was prepared with only 1 minute of cooking was formulated with the irradiated dehydrated onion flakes of this invention. The formula was as follows.

ONION SOUP

| Ingredient: | G. |
|---|---|
| White onion flake (irradiated $0.7 \times 10^6$ rep.) | 10.0 |
| Toasted onion flake (irradiated $0.7 \times 10^6$ rep.) | 10.0 |
| Salt | 6.9 |
| Hydrogenated vegetable oil | 3.0 |
| Protein hydrolysate | 2.9 |
| Beef extract | 2.6 |
| Flour | 2.3 |
| Starch | 2.3 |
| Corn sugar | 1.5 |
| Onion powder | 1.0 |
| Total | 42.5 |

This mix is prepared by adding the mixture to one quart of boiling water and continuing the boiling for 1 minute. When compared to a non-irradiated onion soup mix which was boiled for 10 minutes, it was found that the tenderness of the onions in the soup was about the same as that in the control. In addition the onions which had been cooked for 1 minute had a higher onion flavor because of the reduced leaching effect. Broth flavors were the same in both samples.

EXAMPLE 20

130 g. portions of dehydrated sweet corn having a moisture content of 7.9% were irradiated according to the procedure outline in Example 1. The corn was subjected to the four dosage levels set forth in Table XIII. The irradiated samples were cooked in boiling water for 10 minutes and compared with a control which had been cooked in the same manner. Table XIII shows the results of these experiments:

Table XIII

| Dose (rep. $\times 10^6$) | Cooking time (minutes) | Texture after cooking |
|---|---|---|
| None | 10 | Tough. |
| 2.8 | 10 | Slightly more tender than control. |
| 5.6 | 10 | More tender than control. |
| 11.2 | 10 | Do. |
| 22.4 | 10 | Much more tender than control. |

The irradiated corn was slightly darker than the control sample but was otherwise considered to be satisfactory.

It will be understood that the above-described embodiments of the invention are illustrations only and that modifications will occur to those skilled in the art. The invention is therefore not to be limited to the specific examples disclosed herein but is to be defined by the appended claims.

I claim:

1. The process of irradiating a vegetable which comprises the steps of dehydrating the vegetable to a moisture content of from about 1% to about 20% by weight and thereafter irradiating the dehydrated vegetable with a source of ionizing radiation to provide an absorbed dosage in said vegetable of from .25 million to about 11 million rep., said ionizing radiation source having an energy level which does not exceed about 10 million electron volts in order to avoid induced nuclear reactions in said vegetable.

2. The process of claim 1 wherein the vegetable is carrots.

3. The process of claim 1 wherein the vegetable is onions and the absorbed dosage of radiation is from .25 million to 2.5 million rep.

4. The process of claim 1 wherein the vegetable is cabbage.

5. The process of claim 1 wherein the vegetable is bell peppers.

6. The process of claim 1 wherein the vegetable is celery.

7. The process of claim 1 wherein the ionizing radiation source is an electron accelerator.

8. The process of claim 1 wherein the ionizing radiation source is at least one radio isotope.

9. In a process of preparing a dehydrated vegetable, the step of exposing the dehydrated vegetable at a moisture content of from about 1% to about 20% by weight to a source of ionizing radiation to provide an absorbed dosage in said vegetable of from .25 million to about 11 million rep., said ionizing radiation source having an energy level which does not exceed about 10 million electron volts in order to avoid induced nuclear reactions in said vegetable.

10. In a process of preparing a dehydrated vegetable from the group consisting of carrots, onions, cabbage, bell peppers, celery, Lima beans, green beans, beets, lentils, leek, corn, potatoes and okra, the step of exposing said dehydrated vegetable at a moisture content of from about 1% to about 20% by weight to a source of ionizing radiation to provide an absorbed dosage in said vegetable of from .25 million to about 11 million rep., said ionizing radiation source having an energy level which does not exceed about 10 million electron volts in order to avoid induced nuclear reactions in said vegetable.

11. The process comprising the steps of dehydrating a vegetable from the group consisting of carrots, onions, cabbage, bell peppers, celery, Lima beans, green beans, beets, lentils, leek, corn, potatoes and okra to a moisture content of from about 1% to about 20% by weight and thereafter irradiating the dehydrated vegetable with a source of ionizing radiation to provide an absorbed dosage in said vegetable of from .25 million to about 11 million rep., said ionizing radiation source having an energy level which does not exceed about 10 million electron volts in order to avoid induced nuclear reactions in said vegetable.

12. The product of the process of claim 11.

References Cited in the file of this patent

UNITED STATES PATENTS

| | | |
|---|---|---|
| 2,308,601 | Gentele | Jan. 19, 1943 |
| 2,419,875 | Birdseye | Apr. 29, 1947 |
| 2,456,909 | Brasch | Dec. 21, 1948 |

OTHER REFERENCES

"Refrigerating Engineer," January 1953, pages 55 to 57.

"Food Science Abstracts," March 1954, pages 121 to 125.

"Food Technology," December 1954, pages 536 to 540.

"Food Manufacture," June 1955, pages 233 to 236.

"Food Engineering," August 1955, pages 43 to 47 and 154.